(12) United States Patent
Viegener et al.

(10) Patent No.: US 8,180,849 B2
(45) Date of Patent: May 15, 2012

(54) SYSTEM AND METHOD FOR MANAGING WEB SERVICES

(75) Inventors: Johannes Viegener, Karlsruhe (DE); Harald Schoning, Dieburg (DE); Bjoern Brauel, Muhltal (DE); Ulrich Heberer, Gross-Umstadt (DE)

(73) Assignee: Software AG, Darmstadt (DE)

( * ) Notice: Subject to any disclaimer, the term of this patent is extended or adjusted under 35 U.S.C. 154(b) by 900 days.

(21) Appl. No.: 11/746,150

(22) Filed: May 9, 2007

(65) Prior Publication Data
US 2007/0300240 A1   Dec. 27, 2007

(30) Foreign Application Priority Data
Jun. 2, 2006   (EP) ..................................... 06011491

(51) Int. Cl.
*G06F 15/16* (2006.01)
(52) U.S. Cl. ......... 709/217; 709/223; 709/224; 719/320
(58) Field of Classification Search .................. 709/217, 709/223, 224; 719/320
See application file for complete search history.

(56) References Cited

U.S. PATENT DOCUMENTS

| | | | | |
|---|---|---|---|---|
| 2004/0111506 A1* | 6/2004 | Kundu et al. | ................. | 709/223 |
| 2004/0133656 A1* | 7/2004 | Butterworth et al. | ......... | 709/219 |
| 2004/0193703 A1* | 9/2004 | Loewy et al. | ................. | 709/220 |
| 2005/0198200 A1* | 9/2005 | Subramanian et al. | ........ | 709/218 |
| 2006/0064483 A1 | 3/2006 | Patel | | |
| 2006/0235733 A1* | 10/2006 | Marks | ............... | 705/7 |
| 2007/0033194 A1* | 2/2007 | Srinivas et al. | ................. | 707/10 |
| 2007/0233782 A1* | 10/2007 | Tali | ................ | 709/203 |
| 2007/0266035 A1* | 11/2007 | Hays et al. | ....................... | 707/10 |
| 2007/0294399 A1* | 12/2007 | Grossner et al. | .............. | 709/224 |
| 2009/0019106 A1* | 1/2009 | Loupia | .......................... | 709/203 |

FOREIGN PATENT DOCUMENTS

| | | |
|---|---|---|
| WO | 2004010297 A1 | 1/2004 |
| WO | 2005081495 A1 | 9/2005 |

OTHER PUBLICATIONS

European search report for application No. EP 06 01 1491 mailed Dec. 11, 2006.

* cited by examiner

*Primary Examiner* — Mohamed Wasel
(74) *Attorney, Agent, or Firm* — Meyertons Hood Kivlin Kowert & Goetzel, P.C.; Jeffrey C. Hood

(57) ABSTRACT

A system for managing a plurality of web services of a service oriented architecture (SOA) comprising a registry including a description of each of the plurality of web services registered in the registry, a service filter adapted to filter at least one request of a client invoking at least one of the web services registered in the registry, wherein the service filter is adapted for gathering run-time information about the request in accordance with the description of the respective web service in the registry.

19 Claims, 5 Drawing Sheets

Fig. 5

Figure 1:
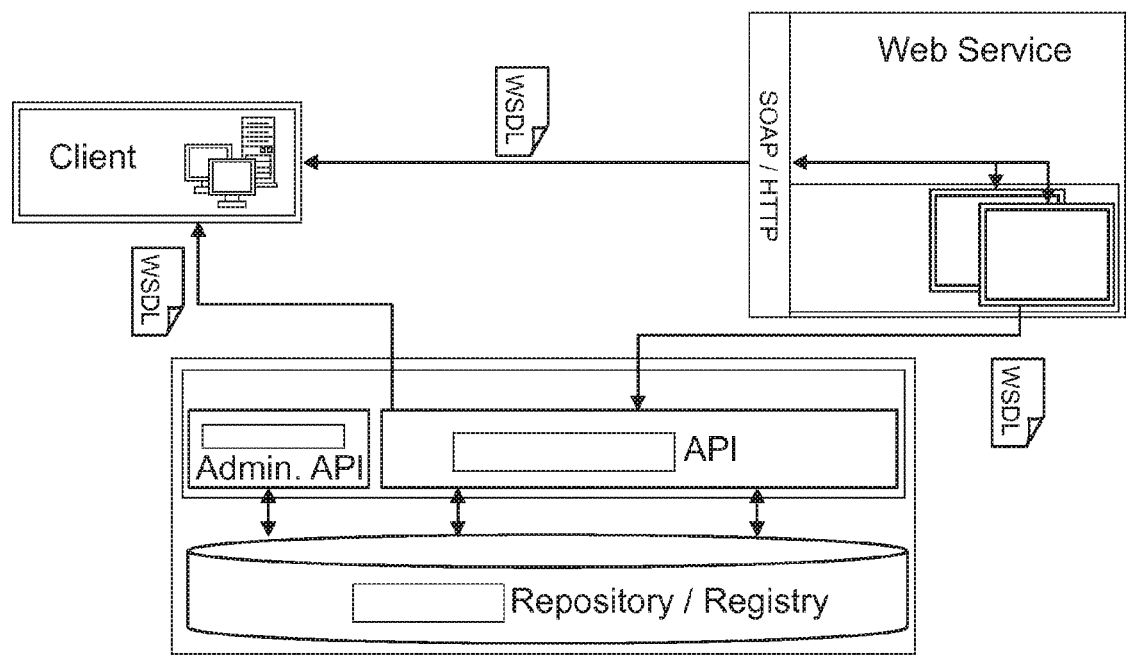

| Service Name | Operation Name | Client IP | Request Size | Server Name | Server Port | URL | Request TimeStamp | Response TimeStamp |
|---|---|---|---|---|---|---|---|---|
| EntryOrderPageService | xdo | 10.20.122.72 | 1129 | PCULHE4.eur.ad.sag | 53307 | /active-bpel/services/HorizontalDemo/EntryOrderPageService | 2006-05-23 16:39:24.515 | 2006-05-23 16:39:31.795 |
| EntryOrderPageService | xdo | 10.20.122.72 | 2772 | PCULHE4.eur.ad.sag | 53307 | /active-bpel/services/HorizontalDemo/EntryOrderPageService | 2006-05-23 16:39:36-222 | 2006-05-23 16:39:36-262 |
| EntryOrderPageService | xdo | 10.20.122.72 | 3031 | PCULHE4.eur.ad.sag | 53307 | /active-bpel/services/HorizontalDemo/EntryOrderPageService | 2006-05-23 16:39:40-207 | 2006-05-23 16:39:50-332 |
| EntryOrderPageService | xdo | 10.20.122.72 | 3125 | PCULHE4.eur.ad.sag | 53307 | /active-bpel/services/HorizontalDemo/EntryOrderPageService | 2006-05-23 16:39:57-322 | 2006-05-23 16:39:57-362 |
| EntryOrderPageService | xdo | 10.20.125.72 | 1129 | PCULHE4.eur.ad.sag | 53307 | /active-bpel/services/HorizontalDemo/EntryOrderPageService | 2006-05-23 08:33:30-907 | 2006-05-23 08:33:38-147 |
| EntryOrderPageService | xdo | 10.20.125.72 | 2773 | PCULHE4.eur.ad.sag | 53307 | /active-bpel/services/HorizontalDemo/EntryOrderPageService | 2006-05-23 08:33:42-644 | 2006-05-23 08:33:42-684 |
| EntryOrderPageService | Xdo | 10.20.125.72 | 3032 | PCULHE4.eur.ad.sag | 53307 | /active-bpel/services/HorizontalDemo/EntryOrderPageService | 2006-05-23 08:33:49-454 | 2006-05-23 08:33:58-116 |
| GrantLoanService | getCCInfos | 10.20.122.72 | 393 | pculhe 4.eur.ad.sag | 53307 | Grantloanws/services/GrantLoanService | 2006-05-23 13:34:23-913 | 2006-05-23 13:33:24-334 |
| GrantLoanService | getCCInfos | 10.20.122.72 | 393 | pculhe 4.eur.ad.sag | 53307 | Grantloanws/services/GrantLoanService | 2006-05-23 13:35:13-584 | 2006-05-23 13:35:13-594 |
| GrantLoanService | getCustomerformation | 10.20.122.72 | 441 | pculhe4.eur.ad.sag | 53307 | Grantloanws/services/GrantLoanService | 2006-05-23 14:18:01-587 | 2006-05-23 14:18:01-627 |
| GrantLoanService | getCustomerformation | 10.20.122.72 | 606 | PCULHE4.eur.ad.sag | 53307 | Grantloanws/services/GrantLoanService | 2006-05-23 16:36:13-160 | 2006-05-23 16:36:13-460 |
| GrantLoanService | getRating | 10.20.122.72 | 559 | PCULHE4.eur.ad.sag | 53307 | Grantloanws/services/GrantLoanService | 2006-05-23 16:36:23-915 | 2006-05-23 16:36:23-925 |

SYSTEM AND METHOD FOR MANAGING WEB SERVICES

PRIORITY CLAIM

This application claims benefit of priority of European application no. EP 06011491.5 titled "System and Method for Managing Web Services", filed Jun. 2, 2006, and whose inventors are Johannes Viegener, Harald Schoning, Bjoern Brauel and Ulrich Heberer.

INCORPORATED BY REFERENCE

European application no. 06011491.5 titled "System and Method for Managing Web Services", filed Jun. 2, 2006, and whose inventors are Johannes Viegener, Harald Schoning, Bjoern Brauel and Ulrich Heberer, is hereby incorporated by reference in its entirety as though fully and completely set forth herein.

1. TECHNICAL FIELD

The present invention relates to a system and a method for managing web services of a service oriented software architecture.

2. THE PRIOR ART

Web services are standardized interfaces for exchanging data from one computer to another over a computer network, for example the Internet. An application may request data from a server over the computer network using a web service provided by the server. Such a request is typically enclosed in a SOAP envelope, which is conveyed using HTTP, and may comprise XML in conjunction with other web-related standards. More technically advanced applications combine various web services to obtain or process the desired data. A software architecture, which is developed around a plurality of web services, is called a service oriented architecture (SOA).

In a SOA resources are made available to participants in the network as independent services that the participants can access in a standardized way. Whereas most definitions of a SOA use SOAP requests conveyed via HTTP/HTTPS over TCP/IP, a SOA may use any web service-based technology. The web services interoperate based on formal definitions which are independent from the underlying platform and programming language. The interface definition encapsulates the specific implementations. A SOA is independent of a specific development technology (such as Java and .NET). The software components become very reusable because the interface is standards-compliant and is independent from the underlying implementation of the web service logic. For example, a C# (C Sharp) service could be used by a JAVA application and vice versa.

However, managing a SOA is a complex and difficult task. Maintaining an overview of the whole landscape of web services, some of which may dynamically change over time, is important to assure that an application using the various web services properly operates. It is therefore known in the prior art to provide a centralized registry/repository such as CentraSite or Systinet 2. The basic principles of the operation of such a registry/repository are illustrated in FIG. 1:

As can be seen, the centralized registry comprises descriptions of web services of a SOA. Each web service is described by a Web Services Description Language (WSDL) file and registered using an API, e.g. UDDI. The WSDL file contains typically information about the function, the data, the data type and the exchange protocols of the respective web service. A client intending to send a request to a certain web service can obtain the WSDL file either from the web service itself or from the registry/repository to find out how to access the web service. As shown in FIG. 1, the registry/repository provides various APIs for accessing the information stored in the registry and for its management. Beside the WSDL document and the registration of the service, the registry/repository can be used to store any type of artefact related to the service, e.g. policies.

A centralized registry is useful for the design time of new applications of the SOA. A developer of a new application involving one or more web services can use the stored information to make sure that the web services of the SOA involved in the application receive the data they need and can interact as desired for the new application. However, the registry of FIG. 1 does not provide any runtime information and does not allow to enforce policies or service level agreements concerning one or more web services. Runtime information is for example helpful to improve or monitor the performance and stability of a new application involving a plurality of web services of the SOA.

The WO 2004/010297 discloses an autonomous software agent, which is arranged between a client and a web service. After being configured by a user, the autonomous software agent can monitor and influence the operation of the web service without affecting the web service itself. However, applying the teaching of the WO 2004/010297 to a complex architecture with a large number of web services requires the time-consuming manual configuration of an equally large number of autonomous software agents.

Therefore it would be desirable to provide a more efficient way for managing web services of a SOA, which allows to obtain runtime information about the web services of the SOA and thereby overcomes the above explained deficiencies of the prior art.

3. SUMMARY OF THE INVENTION

In one aspect/embodiment of the invention, this problem is solved by a system for managing a plurality of web services of a service oriented architecture (SOA) comprising a registry including a description of each of the plurality of web services registered in the registry, a service filter adapted to filter at least one request of a client invoking at least one of the web services registered in the registry, wherein the service filter is adapted for gathering runtime information about the request in accordance with the description of the respective web service in the registry.

Accordingly, the service filter uses the already available description of a web service to gather runtime information about the web service. The descriptions defined in the registry are therefore available not only at design time to derive how the plurality of web services operate but define in addition the information, which is to be gathered at runtime from the respective web service, i.e. when a request from a client is actually serviced by the web service. The registry is therefore the central point in the overall SOA. No additional/manual step is needed to ensure the gathering of runtime data from the web service.

In one embodiment, the service filter is further adapted to modify the request during runtime in accordance with the description of the respective web service in the registry. Modifying a request may for example comprise the redirecting of a request directed to a first web service to a second web service (or endpoint) registered in the registry. This may be helpful for load balancing or to dynamically replace a failed web service.

Preferably, the service filter is further adapted to gather statistical data on the usage of the invoked web service such as usage count for a certain web service, bandwidth usage, identities, distribution over time (time of day or longer period), response times and data amount etc.

Furthermore, the service filter may be further adapted to supervise the availability of the invoked web service and to issue an alert if the invoked web service is not available. Policies for alerting (conditions for raising an alert, methods and addressees of alerting) can be stored in the registry, thus allowing a single point of alert configuration. In addition, the registry stores the governance information for a web service (ownership, responsibility) which can be used to dynamically determine the addressees of alerts. Downtimes of an application using a failed web service can thus be reduced.

Preferably, the service filter is adapted to perform at least one lookup in the registry during runtime, wherein the result of the lookup determines the processing of the request and/or its response from the web service by the service filter. Accordingly, the service filter uses the most recent description of the web service to determine its gathering of runtime information.

In one embodiment the runtime information gathered by the service filter is stored, preferably together with the description of the web service in the registry of the system. A developer or any other user can therefore easily access the obtained runtime information together with the description of the respective web service. This storage of runtime information in the registry also enables the search for unusual usage patterns (e.g. for fraud detection) and the recognition of trends, e.g. for prediction of future usage patterns.

In one alternative, the service filter is arranged on a service proxy which might be even running on a different machine than the web service itself. Using a separate proxy component or even a separate machine provides a maximum amount of flexibility for implementing the service filter regardless of the specific implementation of the web service.

According to a further aspect, one embodiment of the present invention concerns a method for managing a plurality of web services of a service oriented architecture (SOA) comprising the steps of providing a registry including a description of each of the plurality of web services registered in the registry, providing a service filter adapted to filter at least one request of a client invoking at least one of the web services registered in the registry, and gathering runtime information about at least one web service with the service filter in accordance with the description of the respective web service in the registry.

Further modifications of the method are defined in further dependent claims.

4. SHORT DESCRIPTION OF THE DRAWINGS

Figure 2:
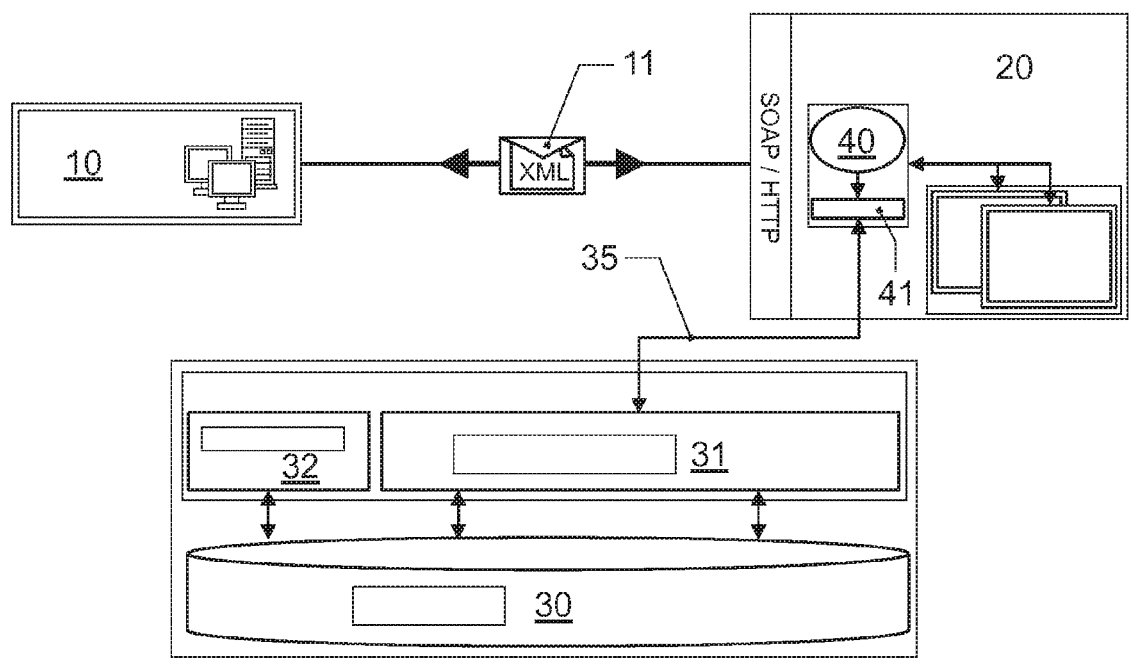
Figure 3:
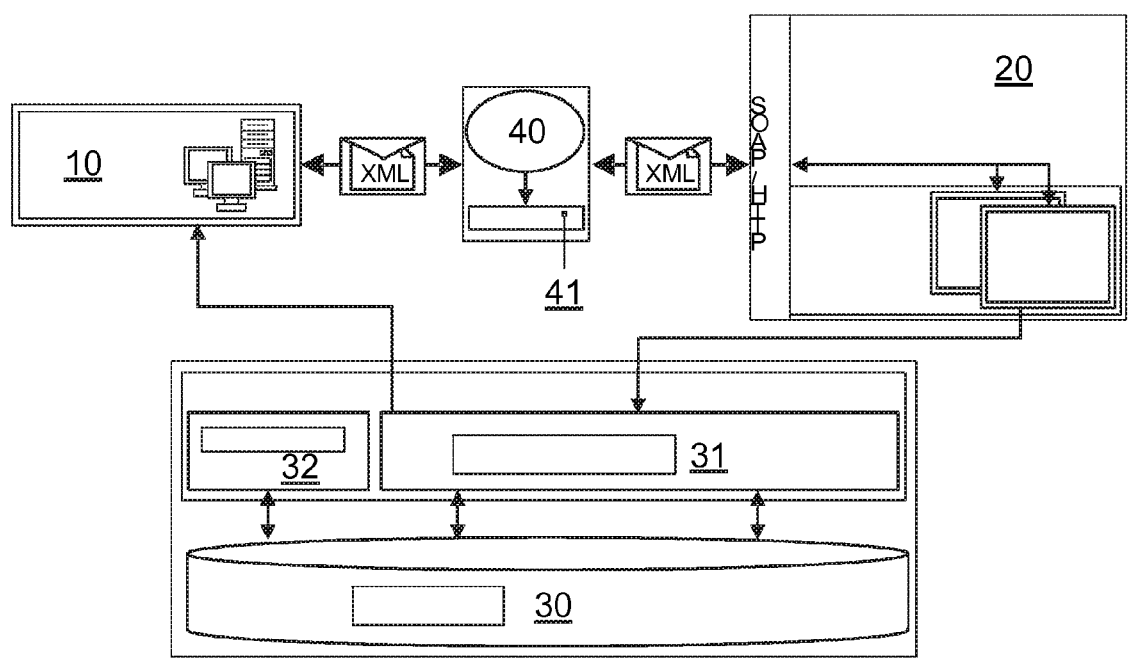
Figure 4:
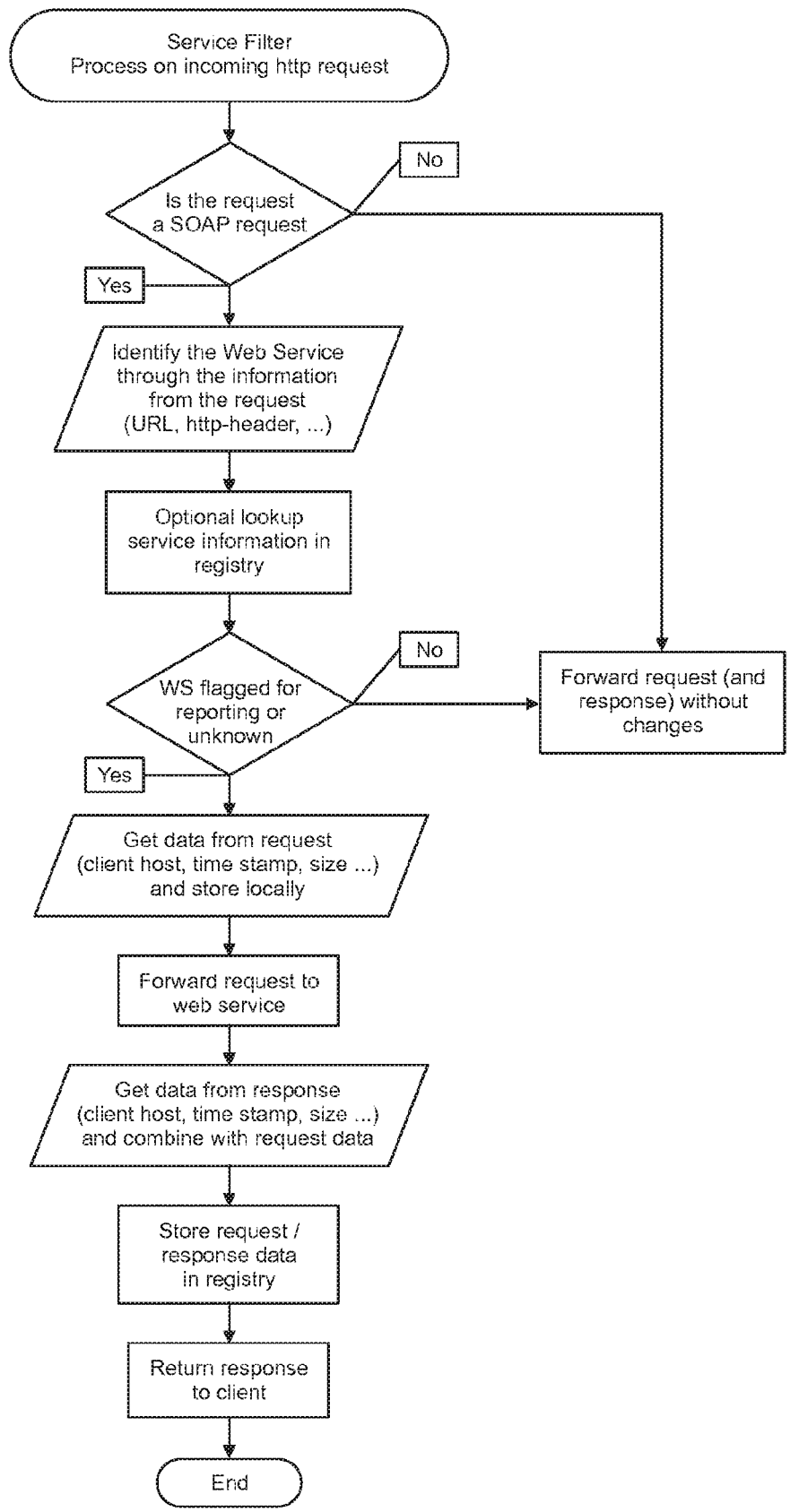

In the following detailed description presently preferred embodiments of the invention are further described with reference to the following figures:

FIG. 1: A registry with descriptions of web services in accordance with the prior art;

FIG. 2: An overview of an embodiment of the system according to one embodiment of the invention;

FIG. 3: An overview of another embodiment of the system according to one embodiment of the invention;

FIG. 4: A flowchart illustrating the various steps performed for the gathering of runtime information in accordance with one embodiment of the present invention;

FIG. 5: A sample output of the runtime information stored in the registry together with descriptions of the respective web service in one embodiment of the present invention; and FIG. 6: Another sample output of the runtime information stored in the registry concerning the number of request to various web services.

5. DETAILED DESCRIPTION OF PREFERRED EMBODIMENTS

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

In the following, embodiments of the system and the method of the present invention are described with respect to managing a simplified arrangement of only a single client 10 accessing a single web service 20. However, it is to be understood that embodiments of the present invention may be used to facilitate the managing of large arrangements having tens or hundreds of web services servicing requests of a plurality of clients.

As can be seen, the system comprises a registry 30. The registry comprises one or more APIs (Application Programming Interfaces) 31 for storing and retrieving WSDL files as well as the runtime information stored in the registry as described below. Further, there is preferably an administration API 32, for administrating the registry 30. The registry 30 may be implemented as program instructions and/or data stored on a memory medium of a computer system and executable by a processor. Thus, for example, the registry 30 may comprise a database of WSDL files with one or more APIs 31 for storing and retrieving the WSDL files. The APIs 31 may be implemented as program instructions, e.g., stored on the memory medium where the registry 30 is stored.

As illustrated by the double headed horizontal arrow in FIG. 2, the client 10 issues a request 11 to a web service 20, for example in order to obtain some data. Preferably, both the request and the response from the client 10 are sent as an XML file using for example SOAP over HTTP. The request received from the client 10, however, is not immediately processed by the web service 20 but at first filtered by the service filter 40. The service filter 40 intercepts the incoming request, modifies the data where needed and hands the request then to the original web service 20. The response from the web service 20 after processing the request may again be processed by the service filter 40 in the opposite direction and finally returned to the client 10. In this manner the service filter 40 obtains during runtime information concerning the request and possibly its response, which is then forwarded and stored in the registry 30, as indicated by the arrow 35 in FIG. 2. Communication of the gathered runtime information and of configuration settings for the service filter 40 is in this embodiment achieved by using a service filter API 41, which communicates with the API 31 of the registry 30:

Runtime information provided by the service filter 40 might in a very simple case be only information about which entity of the SOA calls which web service at what time. In more advanced embodiments the service filter 40 will obtain more information such as user accounts involved, size of a request and its response, processing time, breakdowns, etc. From a more structured point of view the following four different technical areas can be identified, to which the runtime information gathered by the service filter 40 may relate:

First, the runtime information can reveal the statistics for the web services involved in the SOA. Statistical information such as usage count, the provision of interconnection graphs with bandwidth usage and identities, the distribution over time (time of day or longer period) and the response times and data amounts being sent provide an administrator of the SOA with a central view on the usage of the involved web services.

Another aspect is the technical monitoring of the SOA, which involves alerts being sent to the right contacts in case of certain events such as the non-availability of a web service. Monitoring provided by the service filter 40 may further involve virus and security checks, debugging support for the development of new applications and generally an assessment of the quality of service provided by the web services of the SOA. Since all the gathered information is fed back to the registry 30, the registry 30 allows to keep the monitored SOA running from a central point and to assess its success based on historical data.

In addition to gathering information about the SOA, the service filter 40 may in a more advanced embodiment also actively change the processing of a request. Dynamic concepts such as loose coupling can be realized, if the service filter 40 redirects a request initially directed to a certain web service 20 to another web service (not shown in FIG. 2). This technical feature allows using dynamic endpoints in the requests from the client 10 for example for load balancing, if a web service is faced with a large number of requests exceeding its processing capacities or to automatically redirect a request sent to a failed web service to a backup web service (not shown in FIG. 2). Conditions for and details of redirections can also be stored in the registry, thus providing a single point of control.

Finally, the gathering of runtime information can be used to enforce policies or service level agreements, for example concerning a predetermined response time of a web service to a certain request.

In the embodiment of FIG. 2, the service filter 40 performing the above described function is realized as an add-on function to the web service 20, for example with platforms ranging from dedicated web servers and .Net environments (IIS, ASP) to J2EE or Java Servlet based installations of the web service 20, the details of which are generally known to the person skilled in the art.

FIG. 3 presents an alternative embodiment of the system, wherein the service filter 40 is acting as a service proxy separated from the web service 20/application server, which might even be running on a different machine than the web service 20. In this case the description of the web service 20 in the registry 30 is modified for a client, so that the real endpoint of the web service 20 is replaced by the URL of the proxy. This is possible, since the registry 30 has full control over the descriptions of each of the web services of the SOA, which are registered with the registry 30. Due to the changed URL, the client 10 will during runtime call the proxy 40 (FIG. 3), which then transfers the request to the real web service 20 after gathering runtime information and/or modifying the request. The same procedure happens vice versa for the response from the web service 20.

In the following, an exemplary processing of an incoming request by the service filter 40 of the embodiments of FIG. 2 or 3 is explained in detail with reference to the flow chart of FIG. 4:

The processing of an incoming request starts at step 100 with the determination, whether the incoming request is a SOAP request. In the non-limiting embodiment of FIG. 4 only SOAP requests are filtered for runtime information. If the request is a SOAP request, the web service addressed by the request is identified in step 101 using the URL indicated in the header of the request (if not only SOAP requests but also other types of requests are filtered, other techniques may be used to identify the web services addressed in the incoming request).

Step 102 comprises an optional lookup in the registry 30 to obtain the current description of the web service addressed by the request, in particular to determine at runtime, which information is to be gathered from the request and/or its response and whether the request is (additionally) to be modified. Information, which can be obtained during the lookup step 102 and which is evaluated during the subsequent step 103, may concern, whether the addressed web service is flagged for reporting, i.e. whether it is marked in the description in the registry that runtime data are to be gathered for this specific web service. In an SOA having hundreds of web services only a selection of web services might be relevant for obtaining runtime information or for modifying a request from a client.

If the respective web service is not marked for reporting, i.e. gathering of runtime information, or even unknown to the filter, it is forwarded in step 104 and processed by the addressed web service without any further involvement of the service filter. In this case, an alert could be sent to make the fact known that there is an unknown service Otherwise, the runtime information is gathered in step 105 from the request, for example information concerning the requesting client, the host, the time stamp and the size, etc. All of the above mentioned alternatives for the runtime information (and for possible modifications of the incoming request) can be obtained by the filter in this step. The obtained runtime information can be stored locally as shown in FIG. 4 or immediately be sent to the registry (not shown).

After gathering the runtime information from the request in step 105, the request is forwarded to the web service in step 106. The response from the web service is processed by the service filter in step 107 and again either stored locally or immediately forwarded to the registry. If the results of the steps 105 and 107 are stored locally, there is a further step 108, wherein all results are sent to the registry. Subsequently, the response from the web service is returned to the client in step 109. However, the response may also be forwarded to the client before or while the runtime information is sent to the registry. Further, the obtained data may not immediately after each request be sent to the registry but, for example, only periodically after a certain amount of time has passed or after a predetermined number of requests have been processed.

As a result, the registry 30 comprises all information of the registered web services, namely their description and the runtime information. This runtime information is exemplary shown in the screen shot of FIG. 5. As can be seen, the displayed table comprises various columns with exemplary runtime information. Whereas the leftmost column identifies the web service, the second row indicates the IP address of a client, which contacted the services. Further rows indicate the size of the request and its response as well as the user, the server providing the web service, the port of the server and the URL, which was used in the request to contact the web service. The last two columns, finally, contain the time stamps for a request and the corresponding response. Already this simplified example allows deriving valuable information about the performance of the web services, since the time difference between the two time stamps reflects the response time for servicing the respective request.

Figure 6:
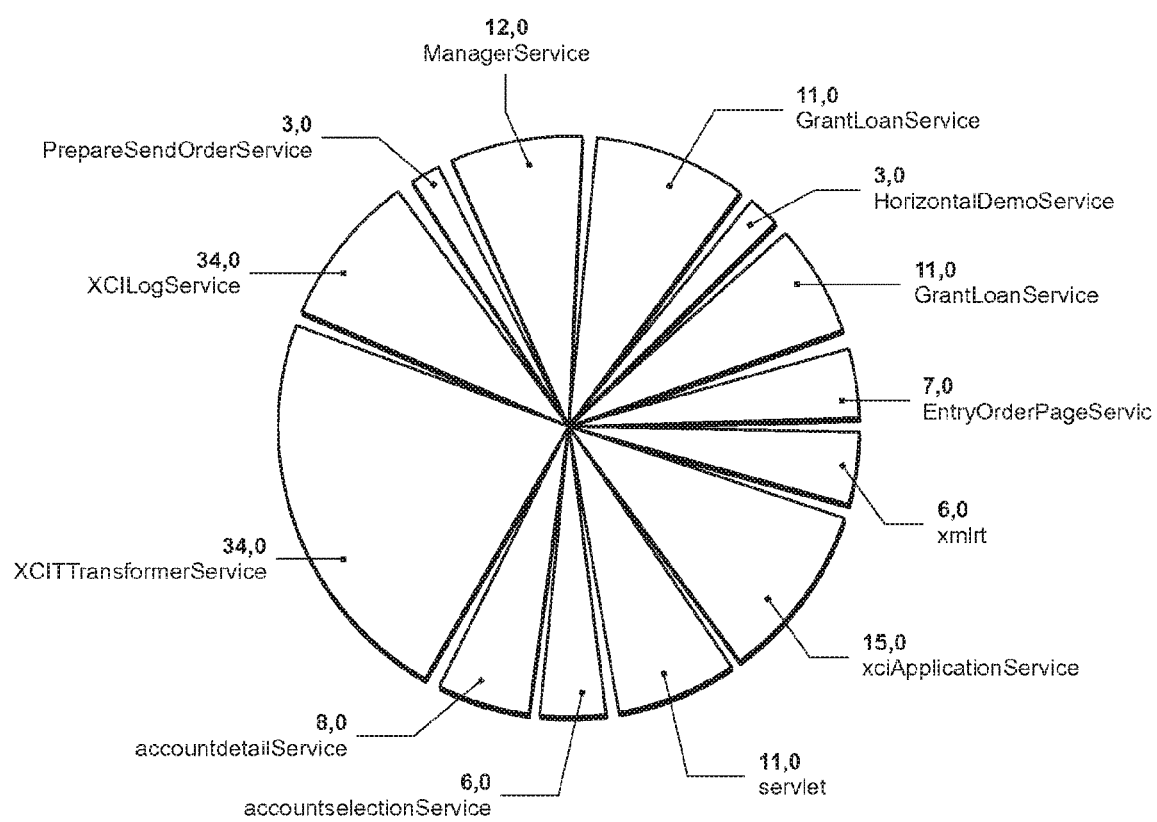

FIG. 6 presents another example of the runtime information concerning the registered web services, as it can be obtained from the registry 30. The pie chart presents a comparison of a number of requests to the web services of the SOA during a certain time period. An administrator can thus easily identify web services which are more often requested than others (for example the web service "XCITransformerService").

If one web service is excessively requested, this situation will be reflected in the pie chart of FIG. 6 and the administrator can immediately initiate counter measures such as redirecting further requests directed to the overloaded web service to another endpoint. As a result, the described system and method allow a user to obtain a full overview and control of the static and dynamic aspects of the managed SOA.

The invention claimed is:

1. A computer-implemented method for managing a plurality of web services of a service oriented architecture (SOA) comprising the steps of:
   a. providing a registry including a description of each of the plurality of web services registered in the registry;
   b. providing a service filter adapted to filter at least one request of a client invoking at least one of the web services registered in the registry;
   c. gathering, by the service filter, runtime information about the at least one request and the web service servicing the at least one request in accordance with the description of the respective web service in the registry;
   d. modifying, by the service filter, the at least one request during runtime in accordance with the description of the respective web service in the registry; and
   e. storing, by the service filter, the gathered information together with the description of the web service in the registry.

2. The method of claim 1, wherein said modifying comprises redirecting a request of the at least one request directed to a first web service to a second web service registered in the registry.

3. The method of claim 1, wherein the service filter gathers statistical data on the usage of the invoked web service.

4. The method of claim 1, wherein the service filter supervises the availability of the invoked web service.

5. The method of claim 4, wherein the service filter issues an alert if the invoked web service is not available.

6. The method of claim 1, wherein the service filter performs at least one lookup in the registry during runtime.

7. The method of claim 1, further comprising the step of providing the service filter acting as a service proxy.

8. A memory comprising program instructions for managing a plurality of web services of a service oriented architecture (SOA), wherein the memory medium comprises:
   a. a registry including a description of each of the plurality of web services registered in the registry;
   b. a service filter adapted to filter at least one request of a client invoking at least one of the web services registered in the registry;
   c. wherein the service filter is adapted for gathering runtime information about the at least one request and the web service servicing the at least one request in accordance with the description of the respective web service in the registry, and modifying the at least one request during runtime in accordance with the description of the respective web service in the registry, wherein the service filter stores the gathered information together with the description of the web service in the registry.

9. The non-transitory computer-readable memory medium of claim 8, wherein said modifying comprises redirecting a request of the at least one request directed to a first web service to a second web service registered in the registry.

10. The non-transitory computer-readable memory medium of claim 8, wherein the service filter is further adapted to gather statistical data on the usage of the invoked web service.

11. The non-transitory computer-readable memory medium of claim 8, wherein the service filter is further adapted to supervise the availability of the invoked web service.

12. The non-transitory computer-readable memory medium of claim 8, wherein the service filter is further adapted to issue an alert if the invoked web service is not available.

13. The non-transitory computer-readable memory medium of claim 8, wherein the service filter is further adapted to perform at least one lookup in the registry during runtime, wherein the result of the lookup determines the processing of the request and / or the response from the web service.

14. The non-transitory computer-readable memory medium of claim 8, wherein the service filter acts as a service proxy.

15. A system for managing a plurality of web services of a service oriented architecture (SOA) comprising:
   a. a first computer system that implements a registry, the registry including a description of each of the plurality of web services registered in the registry;
   b. a second computer system that stores program instructions that implement a service filter, wherein the service filter is adapted to filter at least one request of a client invoking at least one of the web services registered in the registry;
   c. wherein the service filter is adapted for gathering runtime information about the at least one request and the web service servicing the request in accordance with the description of the respective web service in the registry, and modifying the at least one request during runtime in accordance with the description of the respective web service in the registry, wherein the service filter stores the gathered information with the description of the web service in the registry.

16. The system of claim 15, wherein said modifying comprises redirecting a request of the at least one request directed to a first web service to a second web service registered in the registry.

17. A computer-implemented method for managing a plurality of web services of a service oriented architecture (SOA) comprising the steps of:
   a. storing a description of each of the plurality of web services in a registry of a computer system;
   b. receiving a request of a client invoking a first web service registered in the registry; and c. gathering, by a service filter, runtime information about the request and the first web service servicing the request in accordance with the description of the first web service in the registry;
d. modifying, by the service filter, the request during runtime in accordance with the description of the first web service in the registry; and
e. storing, by the service filter, the gathered information together with the description of the web service in the registry.

18. The method of claim 17, wherein said receiving is performed by the service filter.

19. The method of claim 17, wherein said modifying comprises redirecting a request of the at least one request directed to the first web service to a second web service registered in the registry.

* * * * *

UNITED STATES PATENT AND TRADEMARK OFFICE
CERTIFICATE OF CORRECTION

PATENT NO.        : 8,180,849 B2
APPLICATION NO.   : 11/746150
DATED             : May 15, 2012
INVENTOR(S)       : Viegener et al.

It is certified that error appears in the above-identified patent and that said Letters Patent is hereby corrected as shown below:

Title Page item 75 The Inventors:

The Inventors should be identified as

Johannes Viegener, Karlsruhe, GERMANY;
Harald Schöning, Dieburg, GERMANY;
Bjoern Brauel, Muehltal, GERMANY;
Ulrich Heberer, Gross-Umstadt, GERMANY;

In the Claims:

Column 7, Line 63, please delete "A memory" and substitute -- A non-transitory computer-readable memory medium --.

Signed and Sealed this
Second Day of October, 2012

David J. Kappos
*Director of the United States Patent and Trademark Office*